US012618718B2

(12) United States Patent
Śmiechowicz et al.

(10) Patent No.: US 12,618,718 B2
(45) Date of Patent: May 5, 2026

(54) METHOD AND SYSTEM FOR SELECTION AND MONITORING OF A STEAM TRAP USING DEEP NEURAL NETWORK

(71) Applicant: ENEON SP. Z O.O., Warsaw (PL)

(72) Inventors: Mateusz Śmiechowicz, Warsaw (PL); Andrzej Grzebielec, Warsaw (PL); Mirosław Seredyński, Warsaw (PL); Piotr Łapka, Warsaw (PL); Emil Gromadzki, Warsaw (PL)

(73) Assignee: ENEON SP. Z O.O., Warsaw (PL)

( * ) Notice: Subject to any disclaimer, the term of this patent is extended or adjusted under 35 U.S.C. 154(b) by 342 days.

(21) Appl. No.: 18/263,441

(22) PCT Filed: Jan. 27, 2022

(86) PCT No.: PCT/IB2022/050722
§ 371 (c)(1),
(2) Date: Jul. 28, 2023

(87) PCT Pub. No.: WO2022/162578
PCT Pub. Date: Aug. 4, 2022

(65) Prior Publication Data
US 2024/0310217 A1     Sep. 19, 2024

(30) Foreign Application Priority Data
Jan. 28, 2021     (EP) ..................................... 21153956

(51) Int. Cl.
| | |
|---|---|
| *G01K 1/14* | (2021.01) |
| *F16T 1/48* | (2006.01) |
| *G01K 1/02* | (2021.01) |
| *G01K 7/22* | (2006.01) |

(52) U.S. Cl.
CPC .................. *G01K 1/14* (2013.01); *F16T 1/48* (2013.01); *G01K 1/026* (2013.01); *G01K 7/22* (2013.01)

(58) Field of Classification Search
None
See application file for complete search history.

(56) References Cited

U.S. PATENT DOCUMENTS

| | | | | |
|---|---|---|---|---|
| 5,247,457 | A | * | 9/1993 | Ida ............................ F16T 1/00 |
| | | | | 702/33 |
| 2003/0074981 | A1 | * | 4/2003 | Rebik ..................... F16K 31/26 |
| | | | | 73/861.57 |
| 2005/0011278 | A1 | | 1/2005 | Brown et al. |
| 2016/0146399 | A1 | | 5/2016 | Katsura |

(Continued)

FOREIGN PATENT DOCUMENTS

| | | | | |
|---|---|---|---|---|
| WO | WO-2010109485 | A2 | * | 9/2010 ................ F16T 1/48 |

OTHER PUBLICATIONS

International Search Report issued in PCT/IB2022/050722 dated May 6, 2022 (3 pages).

(Continued)

*Primary Examiner* — Erica S Lin
(74) *Attorney, Agent, or Firm* — Osha Bergman Watanabe & Burton LLP

(57) ABSTRACT
The invention relates to a method and system for selecting and monitoring of a Venturi type steam trap in a steam system using deep neural network to process specific parameters of the steam system stored in memory of a data processing unit with the use of temperature detection only.

15 Claims, 5 Drawing Sheets temperature sensors placed at the inlet and at the outlet of a Venturi type steam trap parameters stored in memory of the data processing unit data processing unit using deep neural network for determining and outputting current working conditions and optimum characteristics of the steam trap in a steam system

(56) References Cited

U.S. PATENT DOCUMENTS

| | | | |
|---|---|---|---|
| 2020/0019877 A1 | 1/2020 | Okanohara et al. | |
| 2023/0147522 A1* | 5/2023 | Alanazi .................... | F01K 1/20 |
| | | | 700/47 |

OTHER PUBLICATIONS

Written Opinion issued in PCT/IB2022/050722 dated May 6, 2022 (5 pages).

* cited by examiner temperature sensors placed at the inlet and at the outlet of a Venturi type steam trap parameters stored in memory of the data processing unit data processing unit using deep neural network for determining and outputting current working conditions and optimum characteristics of the steam trap in a steam system

METHOD AND SYSTEM FOR SELECTION AND MONITORING OF A STEAM TRAP USING DEEP NEURAL NETWORK

TECHNICAL FIELD

The present invention relates to a method and system that use deep neural network for selection and monitoring of a Venturi type steam trap used for draining-off liquids from steam driven process predominantly containing gases or vapours. In particular, the present invention allows identifying current working conditions of the steam trap and determining geometrical conditions of the steam trap to achieve optimal characteristics of the steam trap.

BACKGROUND ART

Steam traps are used in many industrial applications to remove a condensate and non-condensable gases such as air while ensuring the live steam is not wasted and is effectively used in the steam system.

There are three known types of steam traps: mechanical traps, thermostatic traps, and thermodynamic traps. Mechanical traps remove condensate by mechanical properties of steam and condensate and these traps may be equipped with valves that open and close or a bucket or a float that rises and falls in relation to condensate level. Thermostatic traps remove condensate through the temperature difference of a steam and a liquid phase and sequentially open and close taking temperature drop below the saturation curve through a bimetallic element. Thermodynamic traps operate on the dynamic principals of steam and condensate and the use of Bernoulli's principle depending on the relationship between the velocity and the pressure exerted by the condensate and steam inside the steam trap.

One kind of thermodynamic trap is Venturi type steam trap in a form of Venturi nozzle having an orifice creating a flash effect. Venturi type steam traps do not have mechanical parts and are thus more reliable and durable without the frequent need for a maintenance. In order to work with maximum efficiency Venturi type steam trap has to be carefully selected for the specific steam system.

WO/1995/022714 A1 describes a continuous flow steam condensate removal device having an entrance end, an entrance passageway, an intermediate passageway which includes a cylindrical venturi tube adjacent an exit of the entrance passageway and a downstream cylindrical discharge-transition passageway adjacent an exit of the venturi tube.

WO/2014/147381 A2 describes a condensate removal device having a condensate drainage channel with a constricted passage forming an orifice therein. A magnet is disposed upstream of the orifice to capture impurities, e.g. magnetic particles, suspended or otherwise carried in condensable gas or condensate.

WO/2016/174691 A1 describes a device for the determination of optimal diameter of the orifice of a Venturi nozzle steam trap in operation in a steam flow circuit. The condensate out from the accumulator is led to the block with a rotating disk-provided with a series of orifices with varying diameters and in a predetermined range of sizes-moved by a stepper motor. For each disk placement, values of condensate level L, temperature T and pressure P are detected by means of sensors placed upstream and downstream of the disk and are transmitted to the processor to verify, for each orifice diameter and related disk position, the phase state of the fluid upstream and downstream of the disk.

EP0426199 A2 describes a trap selector for selecting an optimum trap meeting various uses which is designed to sequentially input required data for selecting the trap and to execute previously memorized trap selecting programs by a microcomputer, wherein the geometrical conditions of the trap are expressed by valve flow coefficient of various kinds of traps are contained in the memory with small capacity without memorizing the discharging flow capacity for various working conditions of various traps.

WO/1998/010218 A1 describes a self-contained electronic system for the monitoring and continuous surveillance of purgers, valves and installations using fluids. The system is comprised of three essential elements: a multiple sensor, an electronic analyzer and an optional receiver. The sensor measures the conductivity, the pressure and temperature of the fluid.

WO/2005/034046 A1 describes a system diagnosing method, comprising the steps of: performing a trap operation diagnosis; calculating a total trap-passed steam loss amount obtained by aggregating trap-passed steam loss amounts for all the evaluation target steam traps; and generating comprehensive evaluation data. For diagnosing operational conditions of the steam traps the system a detection of surface temperature and vibration (vibration intensity in ultrasonic range) of the steam trap.

WO/2016/163163 A1 describes a threshold value calculation system and a threshold value calculation method for calculating threshold values that are used to determine the state of a steam trap.

The state-of-the-art methods, systems and devices for the assessment of the working conditions of Venturi type steam trap use a combination of detection methods, e.g., a combination of conductivity and temperature detection or a combination of vibration detection (with the use of ultrasound) and temperature detection. Therefore, there is a need for a simple method of selection and/or monitoring of Venturi type steam systems to achieve optimum characteristics of the steam trap in a steam system.

SUMMARY OF INVENTION

An aspect of the present invention is to provide a method for selecting and monitoring of a Venturi type steam trap in a steam system using deep neural network to process specific parameters of the steam system stored in memory of the data processing unit with the use of temperature detection only to determine optimal characteristics of the steam trap.

The method according to an aspect of the present invention is defined by claims 1-8.

Another aspect of the present invention is to provide a system for selecting and monitoring of a Venturi type steam trap in a steam system using deep neural network to process specific parameters of the steam system stored in memory of the data processing unit with the use of temperature detection only to determine optimal characteristics of the steam trap.

The system according to an aspect of the present invention is defined by claims 9-15.

Another aspect of the present invention is to provide a method for monitoring of Venturi type steam trap in a steam system, the method comprising the steps of:

acquisition of temperature readings from the steam system by monitoring module configured to measure a temperature of the condensate from at least one temperature sensor at the inlet of the steam trap and at least one temperature sensor at the outlet of the steam trap;

receiving temperature readings form the monitoring module by a data processing unit;

processing temperature readings obtained from the monitoring module by the data processing unit, wherein the data processing unit is configured to:

process temperature readings using deep neural network to determine current operational characteristics of the steam trap and optimal characteristics of the steam trap, compare determined current operational characteristics of the steam trap with determined optimal characteristics of the steam trap and output a comparison result, receiving the comparison result by an analytical unit to indicate either that the steam trap is working with optimal characteristics or not, wherein both current characteristics of the steam trap and optimal characteristics of the steam trap are represented by the orifice diameter of the steam trap and orifice length of the steam trap.

Another aspect of the present invention is to provide a method for selecting a new Venturi type steam trap for a steam system, the method comprising the steps of:

inputting an assumed value of a temperature of the condensate at the inlet of the steam trap and an assumed value of a temperature of the condensate at the outlet of the steam trap to a data processing unit processing the inputted temperatures values by the data processing unit, wherein the data processing unit is configured to:

process the inputted temperatures using deep neural network to determine optimal characteristics of the steam trap, wherein optimal characteristics of the steam trap are represented by the orifice diameter of the steam trap and orifice length of the steam trap, implementing a new Venturi type steam trap in the steam system having an orifice diameter of the steam trap and orifice length of the steam trap selected according to optimal characteristics in the steam system determined by the data processing unit.

BRIEF DESCRIPTION OF DRAWINGS

Preferred embodiments of the present invention are subsequently described with respect to the accompanying drawings, in which.

DESCRIPTION OF EMBODIMENTS

Figure 1:
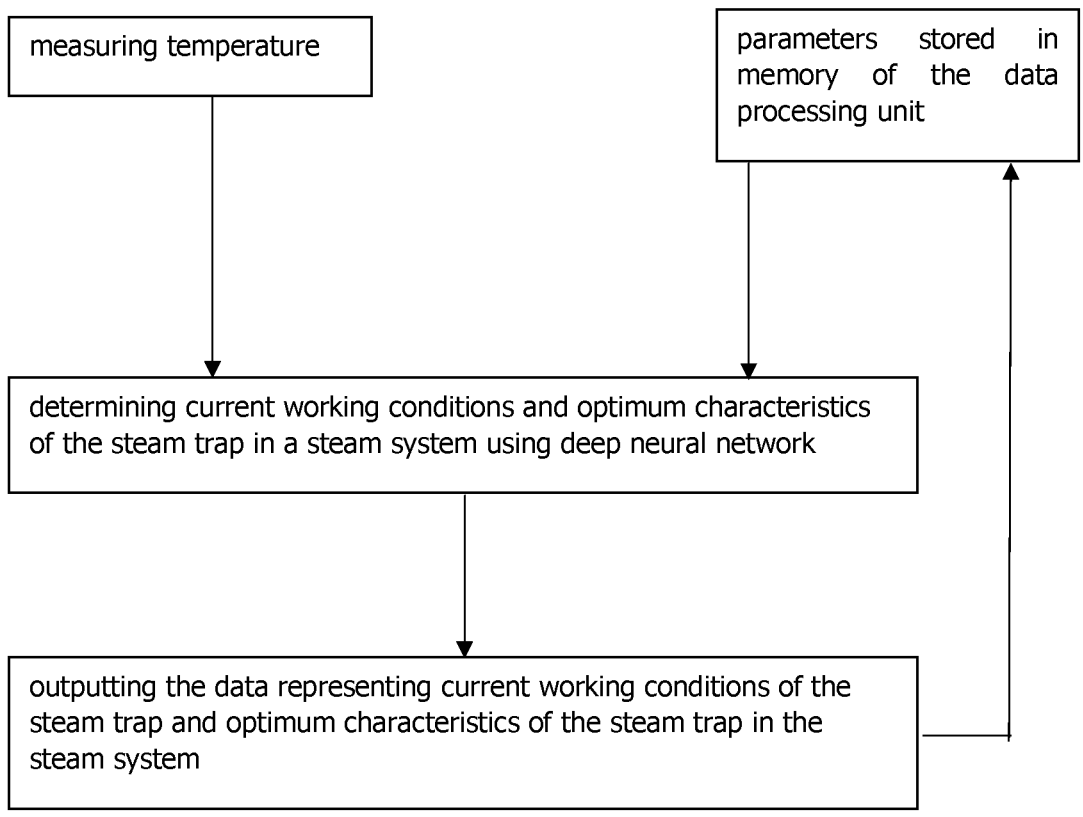
FIG. 1 is a block diagram illustrating the method according to an embodiment.
Figure 2:
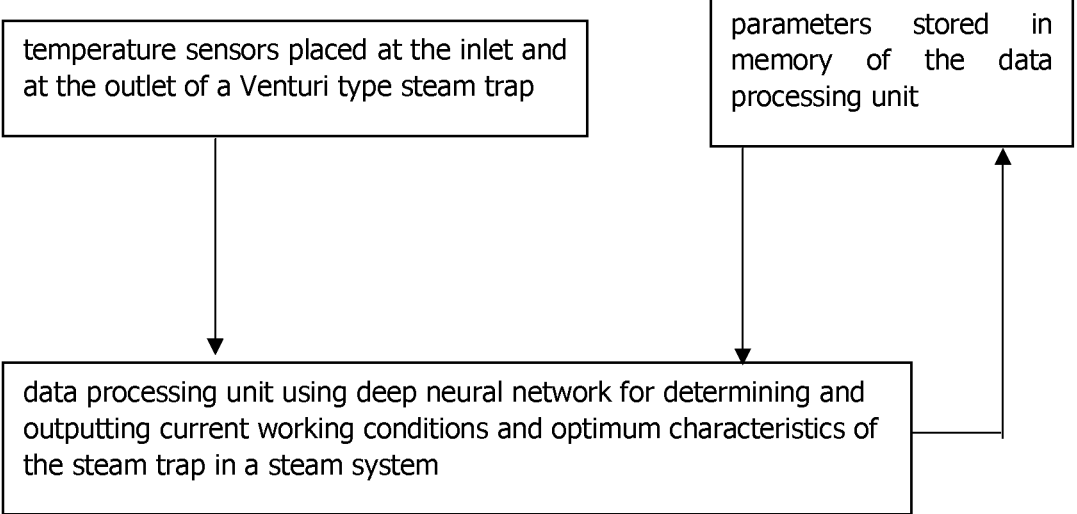
FIG. 2 is a block diagram illustrating the system according to an embodiment.

FIG. 1 is a block diagram illustrating the method according to one or more embodiments. The block diagram in FIG. 1 illustrates method steps of temperature detection, determining current working conditions of the steam trap and optimal characteristics of the steam trap in the steam system using deep neural network designed to determine optimal characteristics of the steam trap and outputting the data representing current working conditions of the steam trap and optimal characteristics of the steam trap in the steam system.

Temperature detection comprises measuring a current temperature of the condensate at the inlet of a steam trap by a temperature sensor placed at the inlet of the steam trap and measuring a current temperature of the condensate at the outlet of the steam trap by a temperature sensor placed at the outlet of the steam trap.

Optionally, temperature may be further detected by the third sensor for measuring a current temperature at the inlet of the technological process operated by the steam system. Third or further sensors may be also placed in different locations of the steam system to acquire temperature data to be used by the data processing unit and which data may be stored in memory of the data processing unit.

Another step of the method of the invention is determining, by a data processing unit having a processor and memory, current working conditions of the steam trap and optimal characteristics of the steam trap in the steam system using deep neural network designed to determine optimal characteristics of the steam trap, by:

processing parameters stored in the data processing unit memory, wherein parameters comprise: a type of steam system, steam pressure, condensate pressure, nominal mass flow rate of the condensate, nominal temperature of the condensate at the inlet of the steam trap and nominal temperature of the condensate at the outlet of the steam trap, calculating optimal characteristics of the steam trap in the steam system, wherein optimal characteristics of the steam trap in the steam system include orifice diameter of the steam trap and orifice length of the steam trap having optimal characteristics of the steam trap, processing of the current temperature of the condensate at the inlet of the steam trap and the current temperature of the condensate at the outlet of the steam trap to obtain current working conditions of the steam trap, optionally, processing of the current temperature at the inlet of the technological process operated by the steam system to obtain further current working conditions of the steam trap, outputting the data representing current working conditions of the steam trap and optimal characteristics of the steam trap in the steam system.

The method according to the invention can be performed in a loop, wherein in at least one iteration, the current temperature of the condensate at the inlet of the steam trap and the current temperature of the condensate at the outlet of the steam trap are recorded in memory of the processing unit and are used in at least one further iteration instead of the nominal temperature of the condensate at the inlet of the steam trap and the nominal temperature of the condensate at the outlet of the steam trap, respectively. Therefore, current working state of the stem trap is determined by using pattern of the historical condensate temperature measurements, being regarded as nominal temperature of the condensate, and current temperature of the condensate as measured from the temperature sensors. Historical and current temperature readings translate into certain patterns, which are used in determination of current working conditions of the steam trap by the deep neural network.

The method according to the invention may further comprise implementing a new Venturi type steam trap in the steam system having an orifice diameter of the steam trap and orifice length of the steam trap selected according to optimal characteristics in the steam system determined by the data processing unit.

The method according to the invention may further comprise signalling, by a signalling module of current working conditions of the steam trap, wherein signalling includes acoustic signalling, optical signalling, mechanical signalling, and electronic message.

An example of the acoustic signalling is an acoustic alarm or other sound produced by a device configured to produce sounds indicating different sounds for different working conditions of the steam trap.

An example of the optical signalling is an optical alarm or other optical signal produces by a device configured to display light signals, including but not limited to optical alarm indicator, monitor, LED diode or combination thereof. Optical signal may be constant or intermittent or have different colours to distinguish different working conditions of the steam trap.

An example of mechanical signalling is a signalizing using a mechanical device configured to change its mechanical state, such as valve, safety switch, relay switch and combination thereof.

An example of electronic message is SMS or email message displayed on a screen of a mobile phone.

Figure 6:
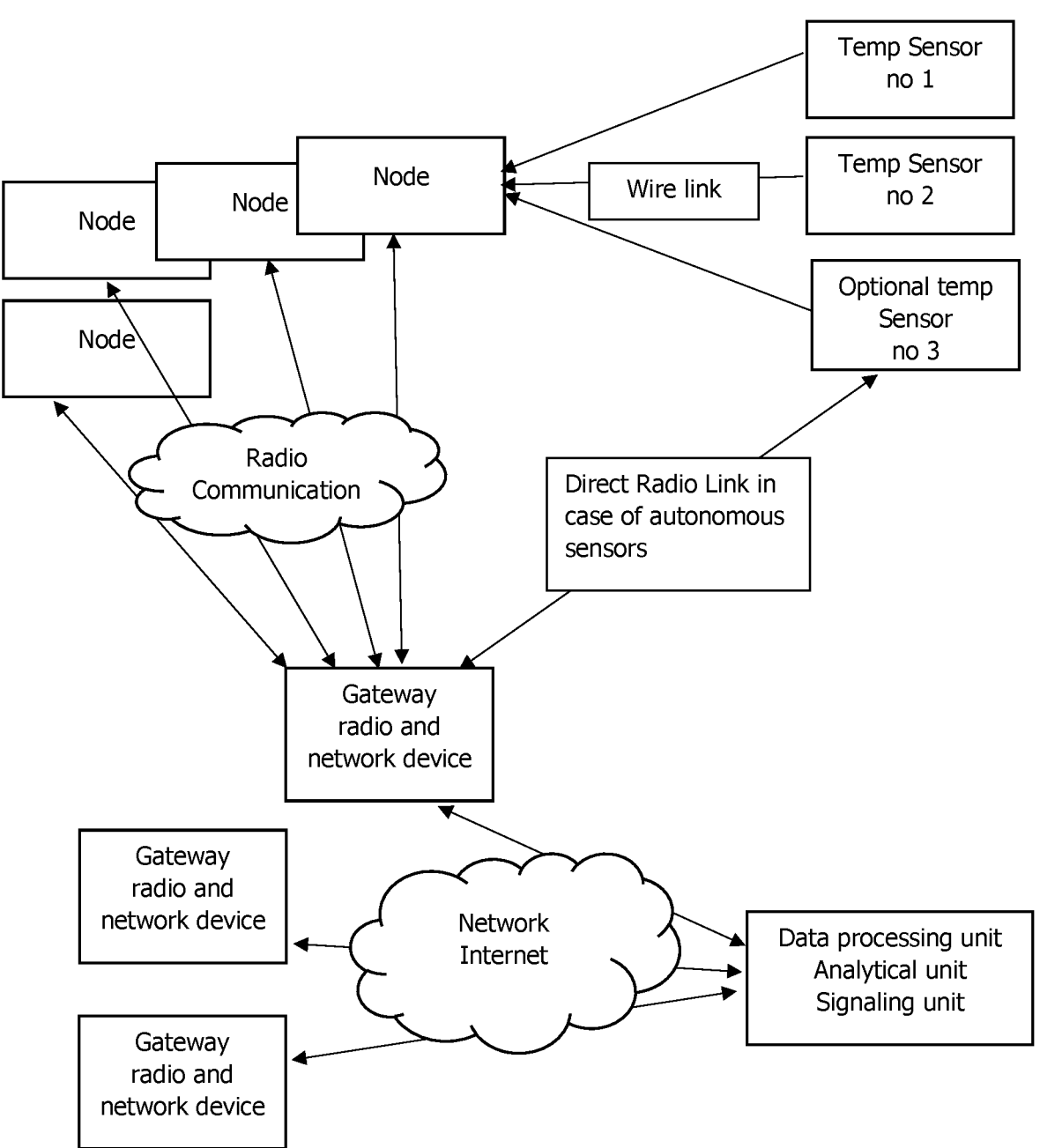
FIG. 6 is an example of a system architecture used for measuring and processing of temperature readings.

In the present invention temperature sensor is selected from NTC sensor, wired sensor, wireless sensor and combination thereof. An example of the NTC sensor is NTC thermistor, which detects changes in the temperature differences of around 1° C. Temperature sensor may be electrically connected by the wire with the data processing unit to transfer temperature readings. Alternatively, temperature sensor may operate by wireless transmission of the signal representing current temperature from the sensor to the data processing unit. FIG. 6 illustrates an example of a system architecture used for measuring and processing of temperature readings. For example, said system architecture comprises temperature sensors (Temp Sensor no 1, Temp Sensor no 2 and Optional temp Sensor no 3) that can be connected by wire link to one or more nodes. Each node uses radio communication to communicate with gateway radio and network device, which communicates with the data processing unit or interconnected unit, such as analytical unit or signalling unit. In one example, said units are configured to communicate with a gateway radio and network device directly, or via Internet (Network Internet). Alternatively, or additionally, temperature sensors can be autonomous, i.e. instead of wire link, said sensors communicate with the gateway radio and network device using direct radio link. In one further example, one or more further gateway radio and network devices are configured to communicate with data processing unit, analytical unit and/or signalling unit via network, such as Internet. Both wired and wireless communication can be one-way or two-way depending on the implementation.

In a preferred embodiment of the present invention wireless temperature sensors equipped with a battery are used to detect and transfer temperature readings to the data processing unit.

The method of the present invention allows for signalling current working conditions, such as but not limited to:
  the steam system is working properly,
  the steam trap ensures the discharge of the correct amount of the condensate,
  the condensate is discharged too quickly, leading to energy losses due to escape of the live steam, the condensate builds up in front of the steam trap, due to its too low discharge,
  the selection of the steam trap mounted in the steam system is not optimal,
  an error in the calculations based on the flow model is detected,
  a change in the operating conditions of the steam system has occurred,
  current efficiency of the steam trap.

Signalling may be performed by providing a list of problems including problems with temperature characteristics diverging in time, or incorrect time correlation between measured temperatures.

Above problems are analysed by the data processing unit in the context of parameters stored in the memory of the data processing unit and/or current temperature readings and in the context of time, in particular in the context of the start time of the particular event and event duration, as temperature changes in time are analysed in dynamic natural systems in order to determine the problem encountered using deep neural network. Examples of the problems include: error in selection of the steam trap, error in computation (error in modelling of the flow), change of the working conditions of the steam system, natural occurring events.

List of problems vary deepening on the number of additional temperature sensors mounted in the steam system and connected to the data processing unit or more generally to the system architecture Based on the output of the determination, by a data processing unit, of current working conditions of the steam trap and optimal characteristics of the steam trap in the steam system using deep neural network, correction parameters to characteristics of the system traps recorded in the memory of the data processing unit are being updated on an ongoing basis.

Due to the fact, that each industrial application is characterised by different variation of working conditions, a data representing different types of steam system are stored in memory of the processing unit. An example of the types of steam system include:
  steam pipeline,
  pipeline heating the flowing medium,
  heat exchanger,
  liquid separator,
  heated tank, including mixer and batch heater,
  turbine,
  vulcanization autoclave,
  system used for hygienic applications.

When the method according to the present invention is used for selecting a Venturi type steam trap, optionally or additionally, type of mounting of the steam trap in a steam system can be considered for the steam trap to work properly. For example, the types of mounting include:
  WO 2022/162578
  9 PCT/IB2022/050722
  internal thread,
  external thread,
  flanged connection,
  tri-clamp connection.

After selection of the Venturi type steam trap and its mounting in the steam system with temperature sensor at the inlet and temperature sensor at the outlet of the Venturi type steam trap, the system is ready to perform monitoring.

Monitoring of the working conditions of the steam trap and its efficiency in the steam system based only on the temperature readings according to the present invention works only with the continuous flow steam trap.

Working conditions of the steam trap compatible with the present invention are determined using deep neural network based on classifiers including temperature at the inlet of the steam trap, temperature at the outlet of the steam trap, input thermophysical parameters and parameters calculated for a specific type of the steam system in time.

The optional third temperature sensor can support the detection of the periods of starting/stopping of the steam system and/or threshold events. In the characteristics of the temperatures and parameters stored in memory of the data processing unit there are no single rules or coefficients according to which the working conditions are determined. Parameters stored in memory of the data processing unit comprise large number of different cases of combination of temperatures vs time and working conditions for different applications of the steam traps, thus allowing for determination of current working conditions and efficiency of the steam trap by the deep neural network.

Efficiency of the steam trap may be expressed as:
Average efficiency:

$$\eta = \frac{1}{\tau} \int_0^\tau \frac{\dot{m}_c(t)}{\dot{m}_v(t)} dt$$

Temporary efficiency:

$$\eta(t) = \frac{\dot{m}_c(t)}{\dot{m}_v(t)}$$

For determination of optimal characteristics of the steam trap, thermodynamic equations describing thermodynamic properties of the steam system are used. For example, mass flow rate of the condensate $\dot{m}_c$, as a function of undercooling temperature $\Delta T[K]$, $\dot{m}_v$—mass flow rate of the steam input, $\tau$ integration time depend on the following parameters: d—diameter of the orifice of the steam trap, /—length of the orifice of the steam trap, $p_v$[kPa]—steam pressure and $p_c$[kPa]—condensate pressure.

Figure 3:
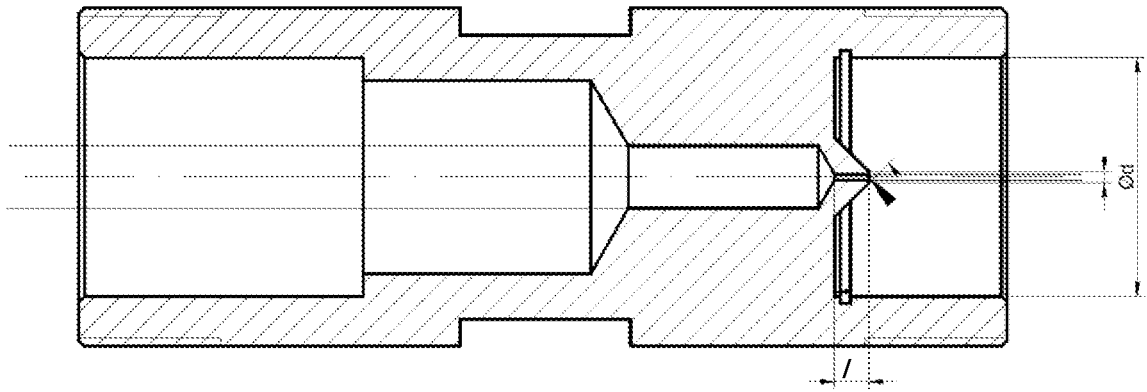
FIG. 3 illustrates an example of a Venturi type steam trap that may be used with the present invention in a longitudinal section view.

FIG. 3 shows an example of a Venturi steam trap that may be used in the present invention, where d denotes diameter of the orifice of the steam trap and/denotes length of the orifice of the steam trap as marked in FIG. 3.

The mass flow rate of the condensate in the steam system may be calculated based on the following equation:

$$\dot{m}_c(d,l,p_v,p_c) = f(\Delta T)$$

where,
$\dot{m}_c$ is mass flow rate of the condensate,
d is diameter of the orifice of the steam trap,
/ is length of the orifice of the steam trap,
$p_v$ is steam pressure,
$p_c$ is condensate pressure, and
$\Delta T$ is undercooling temperature.

Parameters describing characteristics of the steam traps are stored in memory of the data processing unit and are constantly being updated with the use of current temperature readings from the temperature sensors in the steam system and deep neural network.

Figure 4:
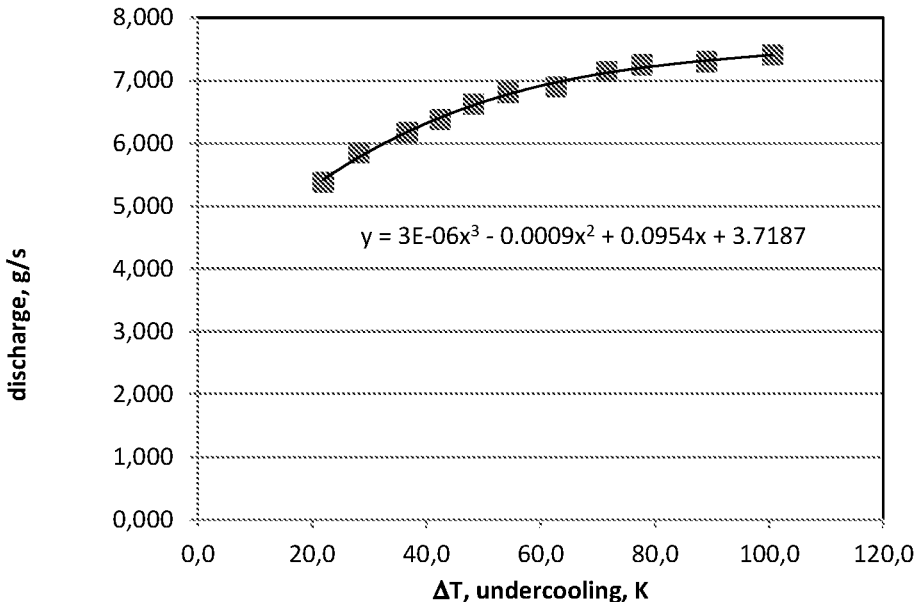
FIG. 4 is a plot illustrating an example of a characteristic of the steam trap.

FIG. 4 shows an example of characteristics of the steam trap plotted as a function of discharge vs undercooling. The parameters of said characteristics are being stored in memory and are used by the deep neural network to determine correlation parameters, according to the following equation:

$$\dot{m}_c(d, l, p_v, p_c, \Delta T) = a_3 \cdot \Delta T^3 + a_2 \cdot \Delta T^2 + a_1 \cdot \Delta T^1 + a_0 \cdot \Delta T^0 \left[\frac{g}{s}\right]$$

where $a_0$, $a_1$, $a_2$, $a_3$ represent correlation parameters, which were calculated using data stored in memory of data processing unit and corrected by the deep neural network using the data comprising characteristics of steam pressure, condensate pressure, undercooling, orifice diameter of the steam trap and orifice length of the steam trap and mass flow rate of the condensate.

Figure 5:
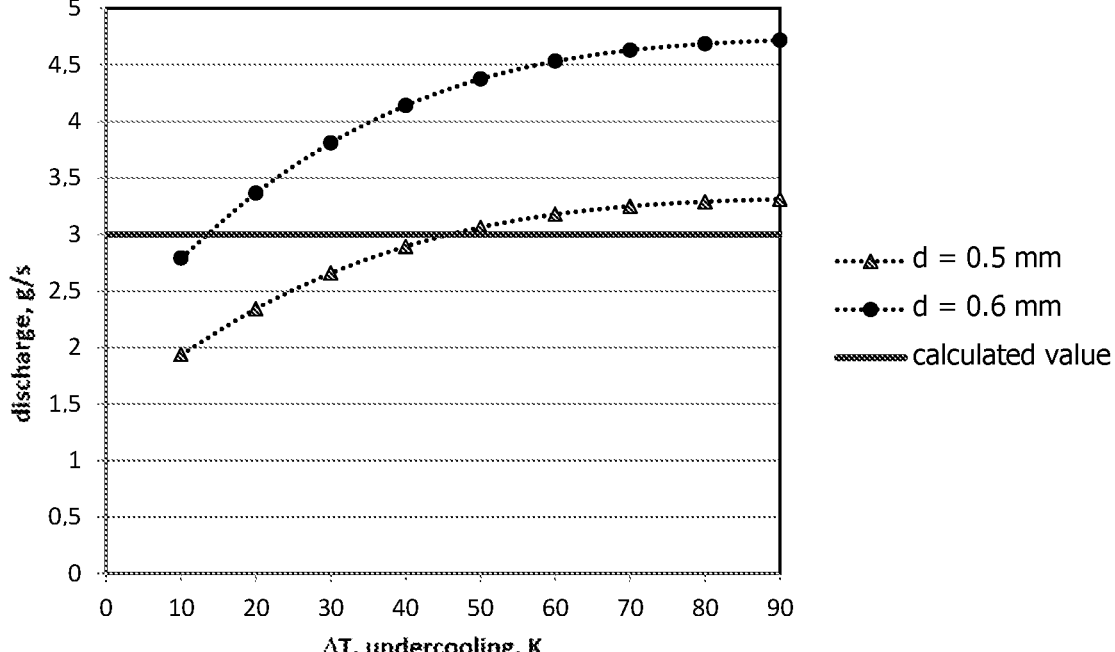
FIG. 5 is a plot illustrating an example of different characteristics of the steam trap.

FIG. 5 shows an example of three characteristics of the steam trap. The first characteristic (solid line) is calculated based on theoretical assumption of desired mass flow rate $\dot{m}_c$=3 g/s for steam pressure of $p_v$=400 kPa, and condensate pressure of $p_c$=100 kPa. The characteristic with dotted line with circles corresponds to the steam trap having an orifice diameter of 0.5 mm. The characteristic with dotted line with triangles corresponds to the steam trap having an orifice diameter of 0.6 mm. Both steam traps meet the requirement of mass flow rate of 3 g/s, but at the different undercooling value. At this stage it is not possible to determine which of the steam traps will be optimal in the given steam system.

Therefore in order to implement the present invention deep neural network is used to process the parameters stored in the data processing unit memory, wherein the parameters comprise: a type of steam system, steam pressure, condensate pressure, nominal mass flow rate of the condensate, nominal temperature of the condensate at the inlet of the steam trap and nominal temperature of the condensate at the outlet of the steam trap and calculate optimal characteristics of the steam trap in the steam system, wherein optimal characteristics of the steam trap in the steam system are represented by an orifice diameter of the steam trap and/or orifice length of the steam trap.

Moreover, deep neural network may calculate different variables or parameters describing physical or thermophysical properties of the steam system.

It is understood that the features referring to the elements of the method of the present inventions corresponds to the features of corresponding elements of the system according to the present invention, where the function of these elements is similar or the same.

The embodiments and examples of the present invention are to be regarded in all respects as merely illustrative and not restrictive. Therefore, the present invention may be embodied in other specific forms without deviating from its essence and the present invention, which is to be limited only by the scope of the claims.

The invention claimed is:
1. A method for selecting and monitoring of a Venturi type steam trap in a steam system, comprising:
   measuring a current temperature of a condensate at an inlet of a steam trap by a temperature sensor placed at the inlet of the steam trap,
   measuring a current temperature of the condensate at an outlet of the steam trap by a temperature sensor placed at the outlet of the steam trap,
   optionally, measuring a current temperature at the inlet of a technological process operated by the steam system by a temperature sensor placed at the inlet of said technological process,
   determining, by a data processing unit having a processor and memory, current working conditions of the steam trap and optimal characteristics of the steam trap in the steam system using deep neural network designed to determine optimal characteristics of the steam trap, by:

processing parameters stored in the data processing unit memory, wherein the parameters comprise: a type of steam system, steam pressure, condensate pressure, nominal mass flow rate of the condensate, nominal temperature of the condensate at the inlet of the steam trap and nominal temperature of the condensate at the outlet of the steam trap, calculating optimal characteristics of the steam trap in the steam system, wherein optimal characteristics of the steam trap in the steam system include orifice diameter of the steam trap and orifice length of the steam trap, processing of the current temperature of the condensate at the inlet of the steam trap and the current temperature of the condensate at the outlet of the steam trap to obtain current working conditions of the steam trap, optionally, processing of the current temperature at the inlet of the technological process operated by the steam system to obtain further current working conditions of the steam trap, outputting data representing current working conditions of the steam trap and optimal characteristics of the steam trap in the steam system.

2. The method according to claim 1, further comprising: installing in the steam system a Venturi type steam trap having an orifice diameter of the steam trap and an orifice length of the steam trap selected according to optimal characteristics determined by the data processing unit.

3. The method according to claim 2, further comprising signalling, by a signalling module of current working conditions of the steam trap, wherein signalling includes acoustic signalling, optical signalling, mechanical signalling and electronic message.

4. The method according claim 1, wherein the temperature sensor is selected from the group consisting of NTC sensor, wired sensor, wireless sensor and combinations thereof.

5. The method according to claim 3, wherein signalling further comprises at least one of current working conditions:

the steam system is working properly, the steam trap ensures a discharge of a correct amount of the condensate, the condensate is discharged too quickly, leading to energy losses due to escape of a live steam, the condensate builds up in front of the steam trap, due to its too low discharge, the selection of the steam trap mounted in the steam system is not optimal, an error in a plurality of calculations based on a flow model is detected, a change in the operating conditions of the steam system has occurred, current efficiency of the steam trap, temperature characteristics diverging in time, incorrect time correlation between measured temperatures.

6. The method according to claim 1, wherein the steam system is one of the steam systems comprising:

steam pipeline, pipeline heating a flowing medium, heat exchanger, liquid separator, heated tank, including mixer and batch heater, turbine, vulcanization autoclave, or system used for hygienic applications.

7. The method according to claim 1, wherein the method is performed in a loop, wherein in at least one iteration, the current temperature of the condensate at the inlet of the steam trap and the current temperature of the condensate at the outlet of the steam trap are recorded in memory of the processing unit and are used in at least one further iteration instead of the nominal temperature of the condensate at the inlet of the steam trap and the nominal temperature of the condensate at the outlet of the steam trap, respectively.

8. The method according to claim 1, wherein the steam trap is mounted in a steam system using mount types comprising: internal thread, external thread, flange connection, tri-clamp mount.

9. A system for selecting and monitoring of a Venturi type steam trap, comprising:

a Venturi type steam trap mounted in a steam system, a temperature sensor placed at an inlet of the steam trap for measuring a current temperature of a condensate at the inlet of the steam trap, a temperature sensor placed at an outlet of the steam trap for measuring a current temperature of the condensate at the outlet of the steam trap, optionally, a temperature sensor placed at the inlet of a technological process operated by the steam system for measuring a current temperature at the inlet of said technological process, a data processing unit having a processor and memory, configured to determining current working conditions of the steam trap and optimal characteristics of the steam trap in the steam system using deep neural network designed to determine optimal characteristics of the steam trap, by:

processing parameters stored in the data processing unit memory, wherein the parameters comprise: a type of steam system, steam pressure, condensate pressure, nominal mass flow rate of the condensate, nominal temperature of the condensate at the inlet of the steam trap and nominal temperature of the condensate at the outlet of the steam trap, calculating optimal characteristics of the steam trap in the steam system, wherein optimal characteristics of the steam trap in the steam system include orifice diameter of the steam trap and orifice length of the steam trap, processing of the current temperature of the condensate at the inlet of the steam trap and the current temperature of the condensate at the outlet of the steam trap to obtain current working conditions of the steam trap, optionally, processing of the current temperature at the inlet of the technological process operated by the steam system to obtain further current working conditions of the steam trap, outputting data representing current working conditions of the steam trap and optimal characteristics of the steam trap in the steam system.

10. The system according to claim 9, further comprising a signalling module, configured to signalling of current working conditions of the steam trap, wherein signalling includes acoustic signalling, optical signalling, mechanical signalling, and electronic message.

11. The system according to claim 9, wherein the temperature sensor is selected from the group consisting of NTC sensor, wired sensor, wireless sensor and combinations thereof.

12. The system according to claim 10, wherein the signalling module is further configured to signalling at least one of the current working conditions:

the steam system is working properly, the steam trap ensures a discharge of a correct amount of the condensate, the condensate is discharged too quickly, leading to energy losses due to escape of the a steam, the condensate builds up in front of the steam trap, due to its too low discharge, the selection of the steam trap mounted in the steam system is not optimal, an error in a plurality of calculations based on a flow model is detected, a change in the operating conditions of the steam system has occurred, current efficiency of the steam trap, temperature characteristics diverging in time, incorrect time correlation between measured temperatures.

13. The system according to claim 9, wherein the steam system is one of the steam systems comprising:

steam pipeline, pipeline heating a flowing medium, heat exchanger, liquid separator, heated tank, including mixer and batch heater, turbine, vulcanization autoclave, or system used for hygienic applications.

14. The system according to claim 9, wherein the system is configured to operate in a loop, wherein in at least one iteration, the current temperature of the condensate at the inlet of the steam trap and the current temperature of the condensate at the outlet of the steam trap are recorded in memory of the processing unit and are used in at least one further iteration instead of the nominal temperature of the condensate at the inlet of the steam trap and the nominal temperature of the condensate at the outlet of the steam trap, respectively.

15. The system according to claim 9, wherein the steam trap is mounted in a steam system using mount types comprising: internal thread, external thread, flange connection, tri-clamp mount.

\* \* \* \* \*